(12) United States Patent
Razak (10) Patent No.: US 10,072,572 B2
(45) Date of Patent: Sep. 11, 2018

(54) GAS TURBINE ENGINE

(71) Applicant: ROLLS-ROYCE PLC, London (GB)

(72) Inventor: Ahmad Razak, Bristol (GB)

(73) Assignee: ROLLS-ROYCE plc, London (GB)

( * ) Notice: Subject to any disclaimer, the term of this patent is extended or adjusted under 35 U.S.C. 154(b) by 328 days.

(21) Appl. No.: 14/658,606

(22) Filed: Mar. 16, 2015

(65) Prior Publication Data

US 2015/0292402 A1 Oct. 15, 2015

(30) Foreign Application Priority Data

Apr. 9, 2014 (GB) .................................. 1406386.1

(51) Int. Cl.
| | | |
|---|---|---|
| *F02C 3/00* | (2006.01) | |
| *F02C 3/14* | (2006.01) | |
| *F02K 3/06* | (2006.01) | |
| *F02C 6/00* | (2006.01) | |
| *F02C 9/28* | (2006.01) | |

(Continued)

(52) U.S. Cl.
CPC ................ *F02C 3/14* (2013.01); *F02C 3/064* (2013.01); *F02C 6/003* (2013.01); *F02C 7/12* (2013.01); *F02C 9/28* (2013.01); *F02K 3/06* (2013.01); *F02K 3/08* (2013.01); *F05D 2220/323* (2013.01); *F05D 2240/24* (2013.01); *F05D 2240/35* (2013.01); *F05D 2270/082* (2013.01);

(Continued)

(58) Field of Classification Search
CPC .. F23R 2900/03341; F23R 3/007; F02C 7/16; F02C 7/18; F05D 2270/08; F05D 2270/311; F05D 2270/312; F05D 2270/313

See application file for complete search history.

(56) References Cited

U.S. PATENT DOCUMENTS

| | | | | |
|---|---|---|---|---|
| 3,956,886 A | * | 5/1976 | Sedgwick | ............... F23R 3/007 60/753 |
| 4,173,120 A | * | 11/1979 | Grosjean | ................. F01D 5/186 415/115 |

(Continued)

FOREIGN PATENT DOCUMENTS

| | | |
|---|---|---|
| EP | 0 887 539 A2 | 12/1998 |
| EP | 1 544 639 A2 | 6/2005 |

(Continued)

OTHER PUBLICATIONS

Lee et al., "Two-Combustor Engines' Performances Under Design and Off-design Conditions", American Institute of Aeronautics and Astronautics, pp. 1-10, Aug. 2009, Denver, Colorado.

(Continued)

*Primary Examiner* — Craig Kim
*Assistant Examiner* — Katheryn Malatek
(74) *Attorney, Agent, or Firm* — Oliff PLC (57) ABSTRACT

A gas turbine engine. The engine includes a first compressor coupled to a first turbine by a first shaft, the first turbine having first and second turbine stages. A first combustor is provided downstream of the first compressor and upstream of the first stage of the first turbine. A second combustor is provided downstream of the first stage of the first turbine, and upstream of the second stage of the first turbine. A further turbine is provided downstream of the first turbine, and is coupled to a further compressor by a further shaft.

13 Claims, 4 Drawing Sheets

(51) Int. Cl.
*F02K 3/08* (2006.01)
*F02C 3/06* (2006.01)
*F02C 7/12* (2006.01)

(52) U.S. Cl.
CPC ... *F23R 2900/03341* (2013.01); *Y02T 50/671* (2013.01); *Y02T 50/677* (2013.01)

(56) References Cited

U.S. PATENT DOCUMENTS

| | | | |
|---|---|---|---|
| 4,222,235 | A | 9/1980 | Adamson et al. |
| 5,285,256 | A | 2/1994 | Nelson et al. |
| 5,546,183 | A | 8/1996 | Fegley et al. |
| 5,941,060 | A | 8/1999 | Marmilic et al. |
| 2001/0047648 | A1* | 12/2001 | Griffiths ............ F01D 1/10 60/774 |
| 2004/0074239 | A1 | 4/2004 | Tiemann |
| 2007/0234736 | A1* | 10/2007 | Corsmeier ......... F01D 17/143 60/782 |
| 2010/0043443 | A1* | 2/2010 | Noppel ............... F01D 25/30 60/772 |
| 2012/0304660 | A1* | 12/2012 | Kupratis ............. F02C 3/145 60/772 |
| 2014/0234098 | A1 | 8/2014 | Anderson et al. |
| 2014/0366550 | A1 | 12/2014 | Bunker et al. |
| 2015/0000290 | A1* | 1/2015 | Joshi .................... F02C 3/30 60/772 |

FOREIGN PATENT DOCUMENTS

| | | |
|---|---|---|
| EP | 1 643 084 A1 | 4/2006 |
| EP | 1 887 209 A2 | 2/2008 |
| EP | 2 685 280 A2 | 1/2014 |
| FR | 2 398 891 A1 | 2/1979 |
| GB | 514620 A | 11/1939 |
| GB | 600608 A | 4/1948 |
| GB | 2494137 A | 3/2013 |
| WO | 2012/175850 A1 | 12/2012 |
| WO | 2014/105512 A1 | 7/2014 |

OTHER PUBLICATIONS

Oct. 23, 2014 Search Report issued in United Kingdom Patent Application No. GB1406386.1.
Aug. 28, 2015 Search Report issued in European Patent Application No. 15 15 9223.
Oct. 17, 2017 Office Action issued in European Patent Application No. 15159223.5.
Liu F. et al. "Turbojet and Turbofan Engine Performance Increases Through Turbine Burners," Journal of Propulsion and Power, vol. 17, pp. 695-705, May 1, 2001.

* cited by examiner

GAS TURBINE ENGINE

FIELD OF THE INVENTION

The present invention relates to a gas turbine engine and a method of operating a gas turbine engine. Particularly, though not exclusively, the invention relates to gas turbine engines for use in aircraft.

BACKGROUND TO THE INVENTION

There is a continual need to decrease the fuel consumption of aircraft gas turbine engines (for example, in terms of Specific Fuel Consumption (SFC)), in order to save operating costs, and to reduce their environmental impact due to carbon emissions and nitrous oxide (NOx). Another requirement is to reduce "contrails" formed by condensing water vapour produced by aircraft engines when operating at high altitude in some circumstances, again in order to reduce the impact of the aircraft on the environment.

Gas turbine engines comprising "sequential" combustors have been proposed for use in electricity production. Examples include the GT24 gas turbine engine produced by Alstom™. In such gas turbine engines, a second combustor is provided downstream of a first combustor between upstream and downstream turbines. Such an arrangement is described for example in U.S. Pat. No. 5,941,060. Such a system comprises a pair of "constant pressure" combustors, in which fuel is burnt at approximately constant pressure between turbine stages. This fuel is then expanded in a separate downstream turbine stage.

Sequential combustors have also been proposed for aircraft gas turbine engines, particularly for military aircraft, for example in "Two-combustor Engines' Performances under Design and Off-design Conditions" by A S Lee, R Singh and S D Probert, presented at the 45$^{th}$ AIAA/ASME/SAE/ASEE Joint Propulsion Conference and Exhibit in August 2009. However, previous studies have only found arrangements which can be expected to have increased SFC compared to gas turbines having conventional combustors.

This problem is particularly pronounced in gas turbine engines which are required to operate efficiently across a wide range of thrust/power levels. Generally, gas turbine engines have a "design point" at or close to their maximum power at which they produce power most efficiently. At power levels below this design point (so called "off design conditions"), power is produced significantly less efficiently. This is the case for example in gas turbine engines used in civil aircraft, in which the required thrust varies across different phases of flight, and also in gas turbine electrical generators or gas turbines in use in ships, in which reduced power may be required in some circumstances. Single spool gas turbine engines can operate at reduced power relatively efficiently by varying the position of inlet guide vanes upstream of the compressor, thereby allowing operation at a substantially constant turbine entry temperature across a wide range of conditions. However, such operation is not generally practical in multi-spool gas turbines having several compressors driven by separate turbines, as this would require variable geometry turbines or exhaust.

There is also increasing concern in the field of aviation regarding vapour trails produced by high flying aircraft. Vapour trails are artificial clouds that are visible trails of condensed water vapour exhausted by vehicles' engines. Vapour trails may be formed as warm, moist exhaust gas mixes with ambient air, and arise from the precipitation of microscopic water droplets or, if the air is cold enough, ice crystals. It is known that, depending on the timescale considered, the climate-warming impact of aircraft exhaust vapour trails and resulting vapour trail cirrus is of a magnitude similar to or perhaps even greater than that of the $CO_2$ emitted by aircraft, and therefore represents a significant element of aviation's total climate impact. It is therefore desirable to reduce or eliminate the formation of vapour trails from aircraft.

Engines in which further fuel is added between turbine stages are also known (inter-turbine burning), as described for example in GB 514620. In such a cycle, partial combustion takes place in the combustor, and the mixed combustion products and unburned hydrocarbons are passed to a turbine. In the turbine, further fuel is added and burnt and simultaneously expanded (inter-turbine burning), such that the expansion through the turbines is substantially at a constant temperature. Such a process is known as an "isothermal" process, in contrast to the constant pressure process described above, where the fuel is burn completely as feasible in the combustors. Consequently, in a constant temperature process, the expansion within the turbine is closer to an isothermal process while in a gas turbine having sequential combustors, the expansion in the turbines is adiabatic. However, such isothermal expansions are inefficient and such cycles require the use of a recuperator (i.e. a device to transfer heat from the exhaust to the compressor outlet) to overcome the inefficiency of such isothermal cycles.

The present invention describes a gas turbine engine and a method of operating a gas turbine engine which seeks to overcome some or all of the above problems.

SUMMARY OF THE INVENTION

According to a first aspect of the present invention, there is provided a gas turbine engine comprising:

a first compressor coupled to a first turbine, the first turbine having first and second turbine stages coupled to the first compressor by a first shaft;

a first combustor located downstream of the first compressor and upstream of the first stage of the first turbine;

a second combustor located downstream of the first stage of the first turbine, and upstream of the second stage of the first turbine;

a further turbine downstream of the first turbine; and a further compressor located upstream of the first compressor and coupled to the further turbine by a further shaft.

It has been surprisingly found by the inventor that the above arrangement results in a gas turbine engine having improved (i.e. flat) SFC under a wide range of off design conditions (thrusts), and can result in over 3% lower fuel burn for a typical flight cycle compared to a comparable single combustor gas turbine engine. This is due to a significant reduction in engine weight together with a lower SFC.

At least the first combustor may be configured to provide complete combustion of fuel entering the combustor, such that substantially no combustion occurs in the turbine. The first and/or second combustor may comprise an isobaric combustor configured to provide substantially no pressure drop from the entry to the exit of the combustor.

The first and/or second combustor may comprise any of a rich, quick quench, lean burn combustor, a lean burn combustor and a flameless combustor.

The further compressor may comprise a low pressure ratio compressor such as a fan. Alternatively, the further compressor may comprise a high pressure ratio compressor such as a centrifugal compressor or a multi-stage axial flow compressor. The further compressor may comprise both a low pressure ratio compressor and a high pressure ratio compressor downstream of the low pressure ratio compressor. The low pressure ratio compressor may be coupled to the further shaft by a gearbox.

Alternatively, the gas turbine engine may comprise first and second further turbines coupled to respective first and second further shafts, wherein the further compressor may be coupled to the first further shaft, and a fan may be coupled to the second further shaft.

At least the first turbine stage of the first turbine may comprise a metallic material, and may comprise an internal cooling arrangement. The second turbine stage may comprise a ceramic material, and may not be provided with an internal cooling arrangement. It has been found that further benefits can be provided where at least the second turbine is not internally cooled. Alternatively, both the first and second turbine stages may comprise ceramic materials and may be uncooled.

The first combustor may comprise a lean burn combustor, and may comprise a pre-mixed combustion combustor. Advantageously, since the first combustor can be operated at substantially constant exit temperatures during most operating conditions, a lean burn combustor can be more easily implemented without the use of a stabilising diffusion flame. This may result in lower nitrous oxide ($NO_x$) emissions. The second combustor may also comprise a lean burn or diffusion flame combustor.

At least one of the first combustor and second combustor may comprise a cooling system configured to provide cooling air to the respective combustor from one of the compressors. The cooling air for the second combustor may be delivered from a compressor stage upstream of the compressor stage from which the cooling air for the first combustor is delivered. Advantageously, thermodynamic losses from cooling the second combustor are minimised.

Alternatively, the first combustor only may comprise a cooling system. The second combustor may be uncooled, and comprise a high temperature ceramic material. In a still further alternative, both the first and second combustors may be uncooled. Alternatively, the second combustor may be cooled using cooling air delivered from the exhausts of the first turbine stage.

According to a second aspect of the present invention, there is provided a method of operating a gas turbine engine according to the first aspect of the present invention, the method comprising:

where the engine is operated at a thrust level beyond a predetermined minimum, modulating fuel flow to one of the first and second combustors such that the first combustor exit temperature substantially matches a predetermined temperature, and modulating fuel flow to the second combustor to effect desired changes in thrust.

The inventor has discovered that the present invention provides reduced SFC compared to other methods of operation, when the first combustor is operated at a constant combustor exit temperature. The invention can provide for varied thrust by regulation of fuel flow to the second combustor.

According to a third aspect of the present invention, there is provided a method of operating a gas turbine engine according to the first aspect of the present invention, the method comprising:

where the engine is operated at a thrust level beyond a predetermined minimum, modulating fuel flow to the second combustor such that the second combustor exit temperature substantially matches a predetermined temperature, and modulating fuel flow to the first combustor to effect desired changes in thrust.

This method of operation has been found to result in an increased exhaust temperature from the engine. It is thought that this increased engine exhaust temperature can reduce the formation of vapour trails, and so reduce the climate change impact of the engine.

According to a fourth aspect of the present invention, there is provided a method of operating a gas turbine engine, the method comprising:

where the engine is operated at a thrust level beyond a predetermined minimum, selectively operating the engine in one of a first mode and a second mode, the first mode comprising modulating fuel flow to the first combustor such that the first combustor exit temperature substantially matches a predetermined temperature, and modulating fuel flow to the second combustor to effect desired changes in thrust, the second mode comprising modulating fuel flow to the second combustor such that the second combustor exit temperature substantially matches a predetermined temperature, and modulating fuel flow to the first combustor to effect desired changes in thrust; wherein the method comprises operating the engine in the second mode when a vapour trail formation indicator is detected, and otherwise operating the engine in the first mode.

Advantageously, the engine is operated in accordance with a high efficiency operating method when vapour trail forming conditions are not detected, and a lower efficiency (but potentially less environmentally damaging) mode when vapour trails are detected. Consequently, the invention provides improved environmental performance by reducing carbon emissions, while also reducing vapour trail formation.

The method may comprise detecting a vapour trail formation indicator by monitoring one or more of an optical depth downstream of the engine, ambient temperature, ambient pressure and ambient humidity.

DETAILED DESCRIPTION

FIGS. 1 to 4 show a gas turbine engine 10, methods of controlling the engine 10, and a T-S diagram showing the thermodynamic cycle of the engine 10.

Figure 1:
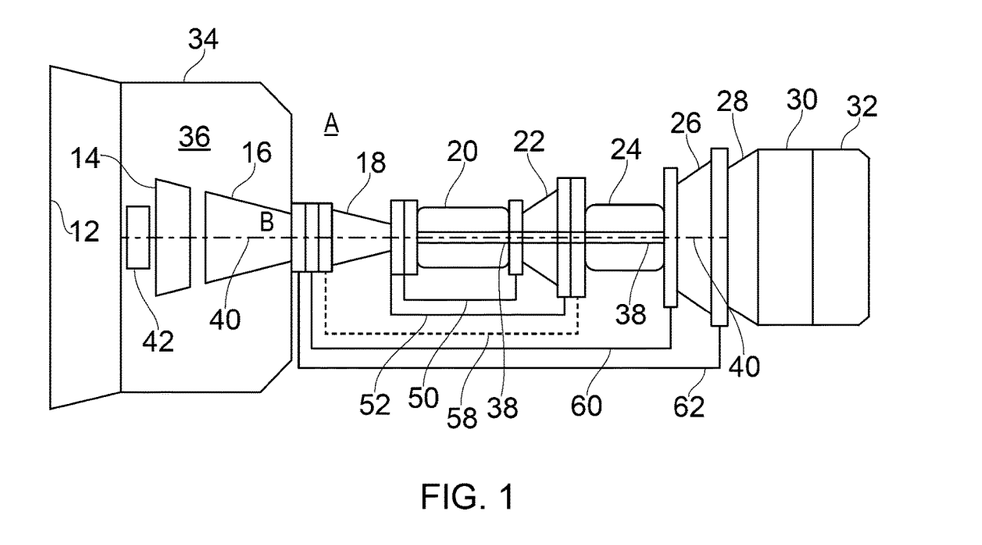
FIG. 1 shows a schematic sectional view of a gas turbine engine in accordance with the present disclosure.

The gas turbine engine 10 comprises an air intake and a propulsive fan 12 that generates two airflows A and B. The gas turbine engine 10 comprises, in axial flow A, a core comprising a booster compressor 14, a high pressure compressor 16, 18, a first combustor 20, a high pressure turbine comprising a first turbine stage 22, a second combustor 24, a second turbine stage 26 of the high pressure turbine, a low pressure turbine 28, an optional afterburner 30, and an exhaust nozzle 32. A fan housing 34 surrounds the core and fan 14 and defines, in axial flow B, a bypass duct 36.

The first and second stages 22, 26 of the high pressure turbine are coupled to the high pressure compressor 16, 18 by a first shaft 38. The low pressure turbine 28 is coupled to the booster compressor 14 and fan 12 by a further shaft 40 arranged coaxially within the first shaft 38. The fan 12 is optionally coupled to the further shaft 40 by a gearbox arrangement 42, which is configured to rotate the fan 12 at a rotational speed lower than that of the shaft 40.

The core and fan flows A, B are sized to provide a bypass ratio of approximately 15:1 to 20:1, or possibly higher. In the case of a smaller engine, the bypass ratio could be lower. That is to say, that the mass of air that flows through the bypass duct 36 is 15 to 20 times the mass of air that flows through the core at any given engine conditions. It is thought that, at such high bypass ratios, a gearbox 42 is greatly desirable since, at such bypass ratios, are large fan diameter is required, as well as a large number of low pressure turbine stages 28. This in turn results in relatively large centrifugal loads and tip speeds, which would result in a relatively heavy fan and containment system. Consequently, by reducing the fan speed using a gearbox, such high bypass ratios may be more easily attainable.

The fan 12 and compressors 14, 16, 18 are designed for an Overall Pressure Ratio (OPR) at top of claim (TOC) of approximately 65:1, at which point the aircraft is typically travelling at an altitude of approximately 30,000 to 40,000 feet. The OPR will be understood to refer to the ratio of the stagnation pressure at the front of the fan 14, to the stagnation pressure of the exit of the high pressure compressor 18. The invention has been found to be particularly suitable at OPRs of approximately 65 or above. This is because at such a high OPR, irreversibility effects in the thermodynamic processes (e.g. component inefficiency in the compression and expansion processes) dominate the efficiency calculation, and so it has been found that the engine 10 of the present disclosure may have a higher thermal efficiency compared to the prior art, or at least may have a similar thermal efficiency and a greater specific work (i.e. the core can generate more power for a given mass of fuel burnt in the engine), thereby driving the SFC of the engine 10 down. However, the engine 10 may be beneficial at lower OPR, since the engine 10 has a reduced weight, which may provide benefits on an overall aircraft level in spite of higher SFC. The high pressure turbine is designed for a relatively low pressure ratio of approximately 1.75.

Figure 2:
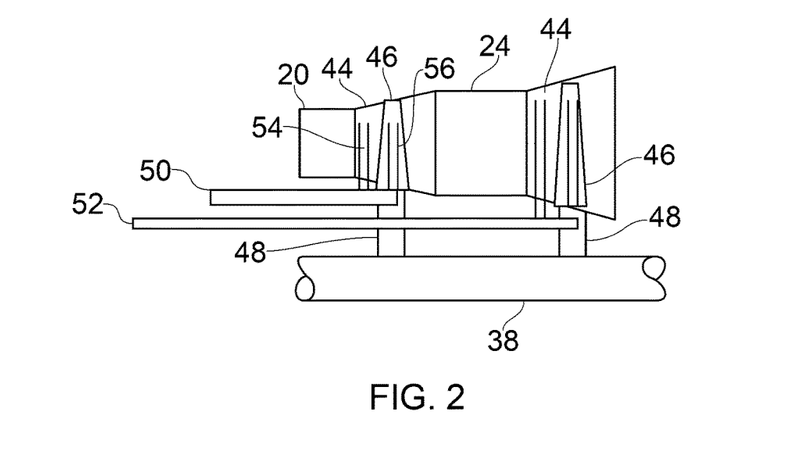
FIG. 2 shows a part of the gas turbine engine of FIG. 1.

The high pressure turbine and second combustor 24 are shown in further detail in FIG. 2. Each of the first and second stages 22, 26 of the high pressure turbine comprises a respective stationary nozzle guide vane (NGV) 44 and a set of rotating turbine blades 46 (only one of which is shown for clarity) downstream of the respective NGV 44. Each NGV 44 is arranged to direct gas to the respective downstream blade 46 at a required angle for efficient operation of the turbine blade 46. Gas impinging on the turbine blade 46 causes the blade 46 to rotate, thereby turning the first shaft 38 via a respective disc 48 to which the respective blades 46 are attached. However, it will be understood that the turbine need not include stators in some instances (so called "statorless turbines").

Each turbine stage 22, 26 of the high pressure turbine is substantially distinct from the combustors 20, 24, such that fuel injected in the combustors 20, 24 is substantially completed burnt therein, prior to entry into the turbines 22, 26. Consequently, expansion within the turbines is substantially adiabatic (with no heat added)—see FIG. 4.

The engine 10 comprises a cooling arrangement configured to cool components of the engine to prevent the materials from which the engine is made from melting or softening as a result of the high temperatures produced by combustion.

Referring to FIG. 1, the cooling system comprises a first cooling duct 50 which receives air from the high pressure compressor 18 discharge, and provides this air to the first combustor 20 to provide dilution air to the combustor 20 during operation.

The cooling system further comprises a second cooling duct 51, which provides cooling air to the first stage 22 of the high pressure turbine.

Referring again to FIG. 2, the blades 46 and NGVs 44 of the first stage 22 of the high pressure turbine comprise internal cooling channels 54, 56. The channels 54, 56 receive high pressure cooling from the second cooling duct 52. The NGVs and blades 44, 46 may also include cooling holes (not shown) on external surfaces of the NGVs and blades 44, 46 which communicate with the channels 54, 56 to provide external film cooling. A similar arrangement cools the vanes 44 and blades 46 of the second turbine stage.

An optional third cooling duct 58 is provided, which provides cooling air to the second combustor 24. This air is taken from a lower pressure stage of the high pressure compressor 18 compared to the air provided to the first cooling duct 50. However, it is thought that this cooling flow represents approximately 20% of core air flow, and consequently represents a significant proportion of core air flow which is partially lost to the thermodynamic cycle of the engine. Consequently, the second combustor 24 may be made of a material having a high melting point such as ceramic, such that cooling air is not necessary, in which case the duct 58 can be omitted. This is advantageous, since deletion of the duct 58 would greatly simplify the secondary air system within the engine 10, and may result in increased SFC due to the reduce demand for bleed air from the compressor 18.

An optional fifth cooling duct 62 is also provided to provide cooling air to the low pressure turbine 28 in a similar manner to the ducts 52, 60. Again, this duct 62 can be omitted by the use of high temperature materials in the low pressure turbine 28.

The engine 10 further comprises a detector system 64 configured to detect the formation of a vapour trail, and produce a signal indicative of whether a vapour trail is being generated by the aircraft. The detector system 64 could comprise any suitable detector or detectors. For example, the detector system 64 could be configured to measure ambient temperature, ambient pressure, ambient humidity and/or vapour trail optical depth, and provide a signal of the presence of a vapour trail on the basis of these measurements. For example, a reduced optical depth downstream of the engine 10 is generally indicative of vapour trail formation. Alternatively, the formation of a vapour trail could be determined on the basis of a lookup table correlated the ambient temperature, ambient pressure and ambient pressure with the likelihood of a vapour trail forming. Appropriate contrail detectors are described in each of U.S. Pat. Nos. 5,285,256, 5,546,183 and EP1544639.

Figure 5:
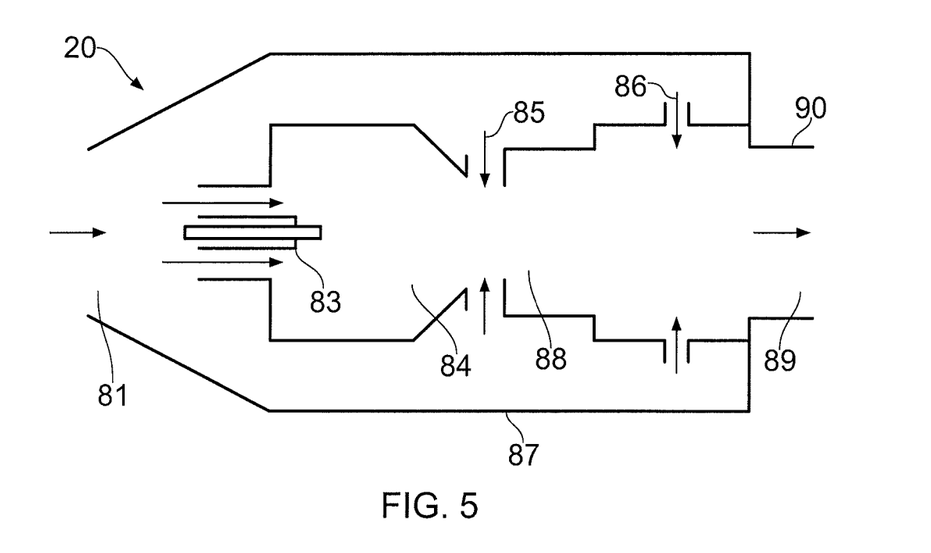
FIG. 5 shows a schematic cross sectional view of a combustor for the gas turbine engine of FIG. 1.
Figure 6:
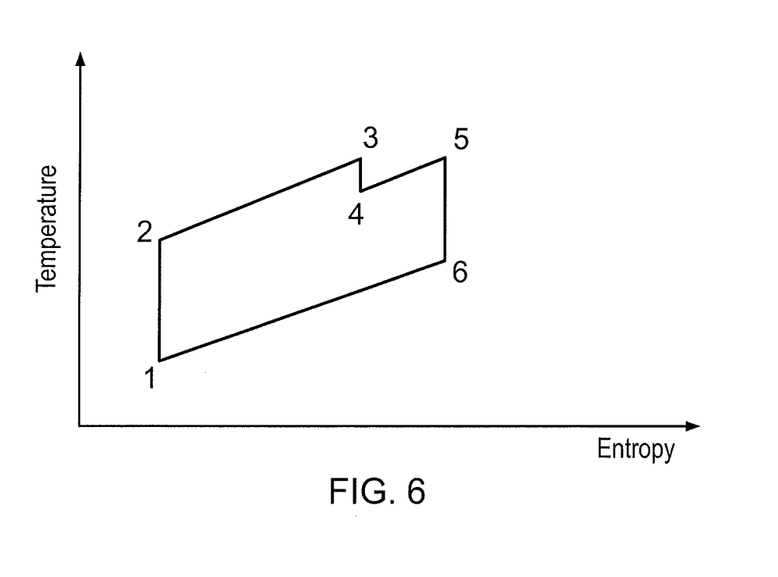
FIG. 6 is a temperature-entropy diagram showing the thermodynamic cycle of the gas turbine engine of FIG. 1.

The first combustor 20 comprises a substantially constant pressure combustor, and may for example comprise a rich burn, quick quench, lean burn (RQL) combustor such as that shown in FIG. 5. In combustor 20, air enter the combustion through an inlet 81 into a combustion chamber 87. Fuel is injected into the combustor 20 by a fuel nozzle 83 into a primary combustion zone 84, and burnt at a fuel/air ratio higher than stoichiometric (for example, at an equivalence ratio of about 1.8. Further air is then added to the still burning fuel at a high rate by quench ports 85 into a secondary combustion zone 88, thereby quenching the combustion to a significantly lower than stoichiometric fuel/air ratio (for example, at an equivalence ratio of between 0.5 and 0.7), while continuing to allow the fuel to burn. Consequently, very little of the combustion process is carried out at close to stoichiometric fuel/air ratios, and so relatively little nitrogen oxides (NOx) is produced. Further dilution air is then gradually added into a dilution zone 89 through dilution ports 86, before exiting the combustor 20 through an outlet 90. Fuel added by the injector 83 is substantially completely burnt by the time the air exits at the outlet 90, prior to flowing to the turbine.

The second combustor 24 also comprises a constant pressure combustor, and may comprise a rich burn combustor, comprising a primary combustion zone in which fuel is injected and burned in a manner similar to that described for the primary zone of combustor 20. It can also operate in a lean mode where combustion occurs at an equivalence ratio lower than 0.6, in which case NOx emissions would be very low. This lean mode may be engaged when the engine is operated under off design (low thrust) conditions. This can be achieved since the temperature of the gases entering the second combustor is well above the auto ignition temperature of the fuel, allowing ignition to take place at equivalence ratios well below the normal lower extinction limit.

In both cases, the pressure of air entering the combustors 20, 24, is substantially the same as that exiting the combustors, such that no pressure loss occurs. However, some minor pressure loss may be unavoidable. In general, combustor pressure losses may be around 3 to 5%. However, none of this pressure loss represents work done on a turbine.

Figure 4:
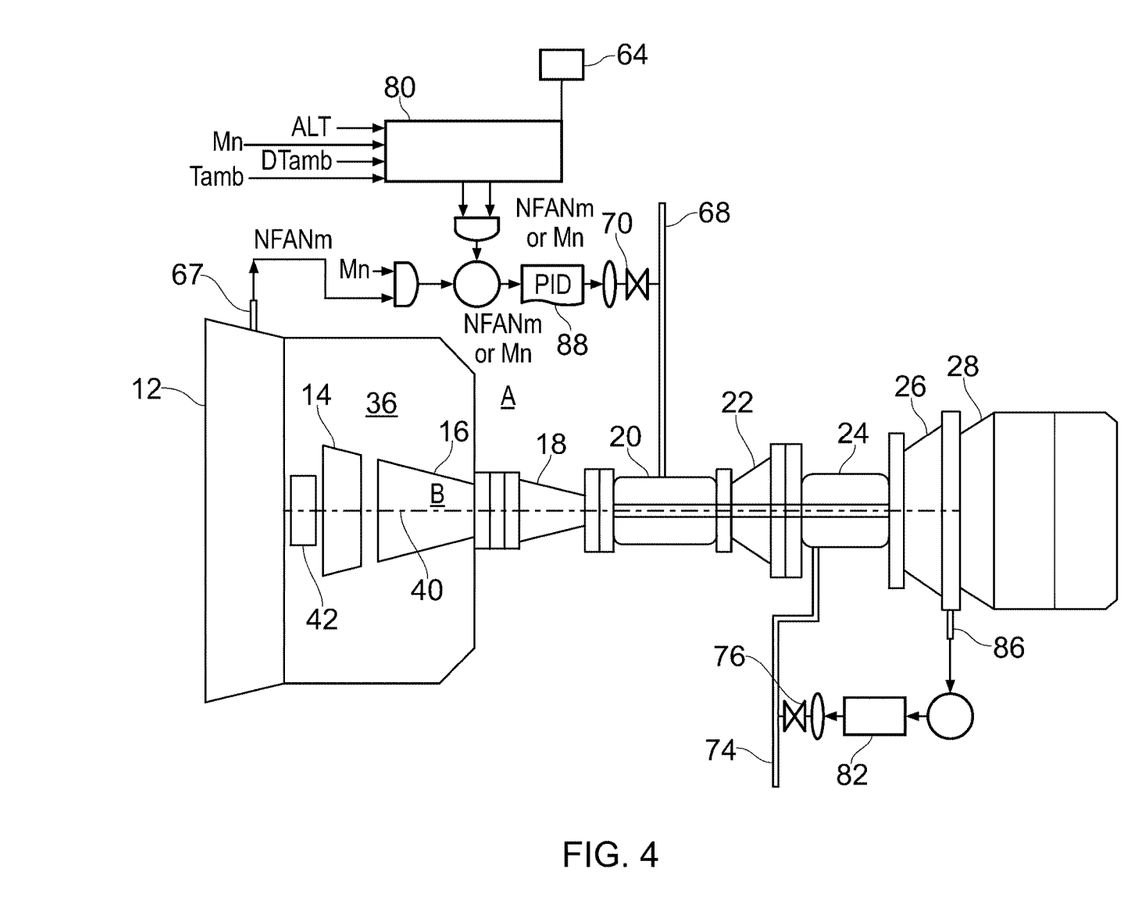
FIG. 4 shows a control arrangement for a second mode of operation of the gas turbine engine of FIG. 1.

FIG. 4 illustrates the thermodynamic cycle of the engine 10. In step 1-2, the working fluid is compressed adiabatically by the compressors 14, 16, 18. In step 2-3, heat is added to the working fluid by the first combustor 20 isobarically. The working fluid is then expanded through the first stage 22 of the turbine, again isentropically in step 3-4. Further heat is added to the working fluid by the second combustor 24 in step 4-5, again, isobarically. The working fluid is then expanded through the second stage 26 of the turbine, again adiabatically in step 5-6.

The engine 10 is operated according to one of a first operating method and a second operating method in dependence on whether or not a vapour trail is detected by the detector system 64, and also in dependence on the thrust level of the engine. Alternatively, the engine 10 could be operated in accordance with either the first or second operating method in accordance with a signal provided by an operator.

At low engine thrust levels, such as around ground idle or slightly above, the engine 10 is operated in a low thrust operating mode, in which the thrust is varied by operating only the first combustor 20, with the second combustor 24 being non-operational (i.e. with no fuel supplied to the second combustor 24). The amount of fuel supplied to the first combustor is varied 20 in accordance with required thrust level (with higher fuel flows corresponding to higher thrust levels). As the thrust level increases, the temperature immediately downstream of the first combustor 20 (i.e. the first combustor outlet temperature) increases. Temperatures downstream of the first combustor 20, such as the first stage of the high pressure turbine 22 (known in the art as T42) also increase. A maximum thrust in which the engine 10 is operated in the low thrust operating mode is attained when T42 reaches a predetermined maximum $T42_{max}$ as determined by a T42 sensor 66 (shown diagrammatically in FIG. 3). T42 is generally correlated with combustor exit temperature, and so a T42 measurement can be used to determine combustor exit temperature (which might be too high to measure directly). Once this temperature is reached, the engine 10 is operated in a high thrust mode in accordance with either a first or second method of operation. In other words, the engine is operated in the high thrust mode when a thrust greater than a predetermined minimum (as determined by the thrust produced when only the first combustor 20 is operated at $T42_{max}$) is required. Alternatively, at low thrust levels, only the second combustor 24 may be operated in a similar manner as that described above for the first combustor 20.

The method of operation in the high thrust mode is determined in accordance with whether a vapour trail signal is provided by the detector system 64. Otherwise, i.e. where a vapour trail signal is not provided (i.e. the detector system 64 determines that no vapour trail is currently being produced by the engine 10), the engine 10 is operated in accordance with the first method. Where a vapour trail signal is provided (i.e. the detector system 64 determines that a vapour trail is currently being produced by the engine 10), the engine 10 is operated in accordance with the second method. Each of these methods is outlined below.

In the first method of operation, the outlet temperature T42 of the first stage of the high pressure turbine 22 is kept at a predetermined temperature, i.e. at $T42_{max}$. The thrust can then be varied by operating the second combustor 24, and varying the fuel flow through the second combustor 24 to provide the required thrust. In some circumstances, the predetermined temperature might not be constant, but could be varied according to known conditions such as an engine fault.

Figure 3:
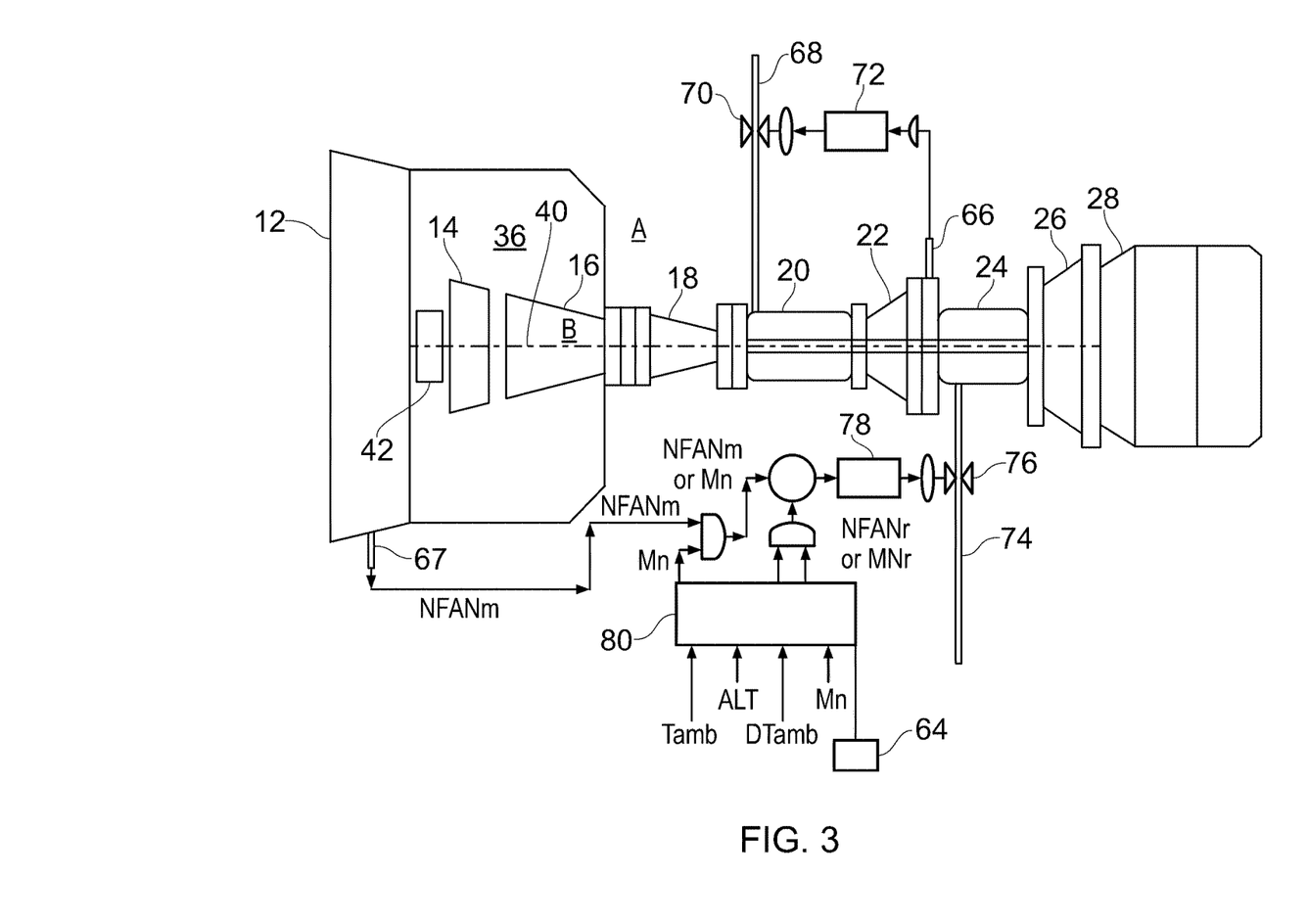
FIG. 3 shows a control arrangement for a first mode of operation of the gas turbine engine of FIG. 1.

FIG. 3 shows this method of operation in more detail. A first combustor fuel line 68 is provided, which provides fuel from a fuel tank (not shown) to the first combustor 20. The fuel flow rate is regulated by a first fuel valve 70, which is in turn controlled by a PID controller 72. The PID controller 72 receives an input from the T42 sensor 66 and compares this to a T42 set point (which may for example be $T42_{max}$)—The fuel flow is then adjusted by the PID controller 72 by modulating the valve 70 such that the sensed T42 matches the set point. In this manner, the first combustor 20 is operated such that T42 is maintained at a substantially constant temperature during any engine conditions above the predetermined minimum.

Meanwhile, the second combustor 24 is controlled as follows. A second combustor fuel line 74 is provided. A second valve 76 is provided to regulate fuel flow, which is in turn modulated by a second PID controller 78.

A required thrust is normally determined in relation to one of a specified fan 14 rotational speed ($NFAN_m$) or specified Mach number (Mn). The second PID controller 78 receives compares a signal from either a fan speed sensor 67 indicative of a measured fan speed $NFAN_m$ where the required thrust is in terms of engine fan speed $NFAN_m$, or from a Mach indicator indicative of a measured Mach number, as determined by an aircraft flight management system (FMS 80).

The Measured fan speed $NFAN_m$ or Mach number Mn is then compared to a signal from the FMS 80 indicative of a required thrust control parameter, such as required fan speed $NFAN_r$, or Total Pressure ratio (TPR). The required thrust control parameter is determined by the FMS 80 on the basis of signals representative of current ambient temperature (Tamb), altitude (ALT), difference between the ambient temperature and the standard temperature (i.e. ISA temperature) for the current altitude (DTamb) and Mach number (Mn) on the basis of ratings data for the required thrust or required Mach number. A lookup table is used, which correlates the measured ALT, DTamb, and Mn to the thrust control parameter. Several lookup tables may be used, such as one for each Mn. The second PID controller 78 then controls the second fuel valve 76 to maintain the $NFAN_m$ or Mn as close as possible to $NFAN_r$ or $Mn_r$. In this manner, T42 is operated at a constant temperature, while the temperature of the second combustor 26 and downstream components is regulated to obtain the required thrust.

This first method of operation has been found to result in a reduced overall fuel burn for the engine 10 as a whole, particularly where the engine 10 is operated at part load/off design conditions (i.e. below maximum power). This is because T42 can be held at a relatively high temperature, even at part load, which results in high thermodynamic efficiency. In contrast, in a conventional gas turbine engine, turbine exit temperature generally falls as thrust is reduced, only reaching a maximum at maximum thrust. It has also been found that decreasing or switching off fuel flow to the second combustor 24 results in a decreased high pressure shaft 38 speed. In contrast, where the first and second combustors drive turbines connected to different shafts and compressors, reduction in fuel flow to the second combustor will increase shaft speed for the shaft connected to the first combustor.

Surprisingly, it has been found that this method of operation is possible in a multi-shaft gas turbine engine having sequential combustion without stalling the high pressure compressor, provided that the second combustor is located between turbine stages of a turbine operating on the same shaft. If the first and second combustors were to be located upstream of turbines driving separate shafts and compressors, any reduction in power in the second combustor (which would be downstream of the first turbine) relative to the first combustor would increase the shaft speed of the compressor driven by the first turbine in light of the reduced downstream pressure. This would thereby lead to stall or surge of the compressor driven by the upstream combustor. In this case, a variable geometry turbine or propelling nozzle would be required, which is difficult to achieve. The present invention does not suffer from this problem, since both combustors drive turbine stages on the same shaft, thereby permitting variable operation of the second combustor independent of the operation of the first combustor. Consequently, the first method of operation results in reduced operating costs.

FIG. 4 shows the second high power operation method, which is used when vapour trail conditions are sensed by the detector system 64.

In this method, the second combustor 24 is controlled in a similar manner to the first combustor 20 in the first operation method. The second fuel line valve 74 is controlled by a third PID controller. Third PID controller 82 receives an input from a T44 sensor 86, which is configured to sense a temperature T44 of the outlet of the second stage 26 of the high pressure turbine, and compares this to a T44 set point. The T44 set point is determined to provide a high turbine exit temperature T44 which results in a reduced vapour trail, or which eliminates the vapour trail. Generally, a higher exhaust nozzle temperature (as a result of a higher T44 temperature) will result in a reduced vapour trail. Consequently, the T44 set point may be a maximum temperature $T44_{max}$ which the second stage 26 of the high pressure turbine can withstand. Alternatively, a lower temperature set point may be adopted, which may result in an increased vapour trail compared to a higher T44 set point, but which will result in lower fuel burn due to the higher T42 that will result in order to obtain the same thrust level. Alternatively, the detector arrangement 64 may determine a minimum exhaust temperature at which no vapour trail (or an acceptably small vapour trail) is produced, and determined the T44 set point on the basis of this maximum exhaust temperature.

The fuel flow to the second combustor 24 is then adjusted by the PID controller 82 by modulating the valve 76 such that the sensed T44 matches the set point. In this manner, the second combustor 24 is operated such that T44 is maintained at a predetermined temperature during any engine conditions above the predetermined minimum.

A fourth PID controller 88 is provided, which controls the fuel valve 70. The fourth PID controller 88 compares a signal from either the fan speed sensor 67 indicative of the measured fan speed $NFAN_m$ where the required thrust is in terms of engine fan speed $NFAN_m$, or from the Mach indicator indicative of a measured Mach number, as determined by the aircraft FMS 80.

The Measured fan speed $NFAN_m$ or Mach number Mn is then compared to a signal from the FMS 80 indicative of a required fan speed $NFAN_r$ or required Mach Number $Mn_r$. Again, the required $NFAN_r$ or $Mn_r$ is determined by the FMS 80 on the basis of signals representative of current ambient temperature (Tamb), altitude (ALT), difference in ambient temperature between the ambient temperature and the standard temperature (i.e. ISA temperature) for the current altitude (DTamb) and Mach number (Mn) on the basis of ratings data for the required thrust or required Mach number. The fourth PID controller 88 then controls the first fuel valve 68 to maintain the $NFAN_m$ or Mn as close as possible to $NFAN_r$ or $Mn_r$. In this manner, T44 is operated at a constant temperature, while the temperature of the first combustor 20 is regulated to obtain the required thrust. This method of operation results in a higher exhaust temperature (and so reduced formation of contrails), but a higher SFC, and so higher operating costs. By operating the engine 10 according to the second operating method only under circumstances in which vapour trail formation is detected by the detector system 64, reduced overall fuel burn for a flight can be achieved, whilst still avoiding contrail formation.

The invention is thought to provide SFC reductions of around 3% compared to an equivalent engine having a single combustor (when not in contrails prevention mode). The two methods of operation also reduce contrail formation in circumstances where contrails would otherwise form, thereby leading to still further environmental improvements. The invention is also thought to result in an engine weighing around 11% less than an equivalent single combustor engine, thereby resulting in further efficiency savings for the aircraft as a whole, as well as improved payload capabilities. In particular, the invention provides an engine having a substantially flat SFC curve, i.e. the specific fuel consumption does not increase as power is reduced, particularly where the engine is operated in the first mode. In view of the substantially constant operation of the first combustor when operated above a certain power, provision of RQL combustor becomes practical, and so the engine has relatively low NOx emissions.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the afterburner 30 could be omitted, particularly where the engine 10 is intended for use in a civilian aircraft.

Aspects of any of the embodiments of the invention could be combined with aspects of other embodiments, where appropriate.

The invention claimed is:

1. A gas turbine engine comprising:
a core that includes, in axial flow:
  a first compressor, a second compressor, a first combustor, a first turbine stage of a first turbine, a second combustor, a second turbine stage of the first turbine, and a second turbine,
  wherein each of the first and second turbine stages of the first turbine are coupled to the second compressor by a first shaft, and the second turbine is coupled to the first compressor by a second shaft that is different from the first shaft, and
  wherein the first and second turbine stages of the first turbine are substantially distinct from the first and second combustors.

2. The gas turbine engine according to claim 1, wherein the first compressor comprises a fan.

3. The gas turbine engine according to claim 1, wherein the first compressor comprises a fan and a multi-stage axial flow compressor.

4. The gas turbine engine according to claim 1, wherein the first turbine stage of the first turbine comprises a metallic material, and has an internal cooling arrangement.

5. The gas turbine engine according to claim 1, wherein the second turbine stage comprises a ceramic material.

6. The gas turbine engine according to claim 1, wherein at least one of the first combustor and the second combustor comprises a lean burn combustor.

7. The gas turbine engine according to claim 1, wherein at least one of the first combustor and the second combustor comprises a cooling system configured to provide cooling air to the respective combustor.

8. The gas turbine engine according to claim 7, wherein the second combustor comprises a high temperature ceramic material.

9. The gas turbine engine according to claim 1, further comprising a controller configured to:
  when the gas turbine engine is operated at a thrust level beyond a predetermined minimum, modulate a first fuel flow to the first combustor such that an exit temperature of the first combustor substantially matches a predetermined temperature, and modulate a second fuel flow to the second combustor to effect the thrust level.

10. The gas turbine engine according to claim 1, further comprising a controller configured to:
  when the gas turbine engine is operated at a thrust level beyond a predetermined minimum, modulate first fuel flow to the second combustor such that an exit temperature of the second combustor substantially matches a predetermined temperature, and modulate second fuel flow to the first combustor to effect the thrust level.

11. The gas turbine engine according to claim 1, wherein the second shaft is arranged coaxially within the first shaft.

12. A gas turbine engine for an aircraft, the gas turbine engine comprising:
a core that includes, in axial flow:
  a first compressor, a second compressor, a first combustor, a first turbine stage of a first turbine, a second combustor, a second turbine stage of the first turbine, and a second turbine,
  wherein each of the first and second turbine stages of the first turbine are coupled to the second compressor by a first shaft, the second turbine is coupled to the first compressor by a second shaft that is different from the first shaft,
  wherein the first and second turbine stages of the first turbine are substantially distinct from the first and second combustors, and
the gas turbine engine further comprises a controller configured to detect the formation of a vapour trail, and produce a signal indicative of whether the vapour trail is being generated by the aircraft.

13. The gas turbine engine according to claim 12, wherein the gas turbine engine is operated according to one of a first operating method and a second operating method in dependence on whether or not the vapour trail is detected, and also in dependence on a thrust level of the gas turbine engine.

* * * * *